Patented June 2, 1931

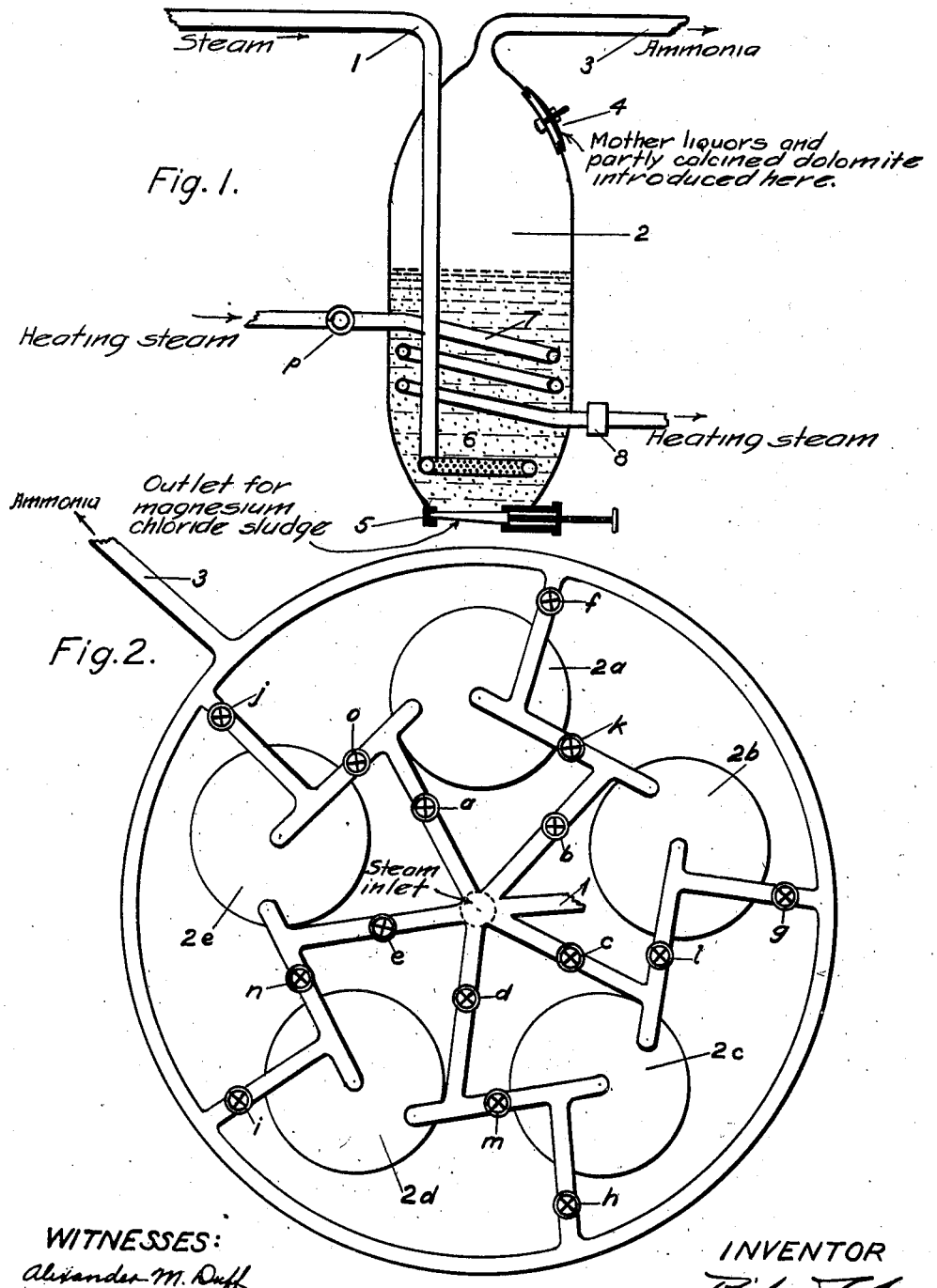

1,808,362

UNITED STATES PATENT OFFICE

RICHARD C. LORD, OF GAMBIER, OHIO, ASSIGNOR TO THE DOW CHEMICAL COMPANY, OF MIDLAND, MICHIGAN, A CORPORATION OF MICHIGAN

PROCESS FOR MAKING MAGNESIUM CHLORIDE AND OTHER MAGNESIUM SALTS OF HIGH PURITY

Application filed February 23, 1924. Serial No. 694,778.

The object of the present invention is to provide an improved and less expensive method or process for making magnesium chloride and other magnesium salts of high purity, by making use of dolomite and the mother liquor from the Solvay or ammonia-soda process, large deposits being adjacent to several ammonia-soda works in the United States.

In the ammonia-soda process for making soda ash it has been the practice to recover the ammonia from the mother liquor containing salt (NaCl), ammonium chloride and ammonium carbonate, by boiling the liquor in a tower or other suitable apparatus until the ammonium carbonate is decomposed, and the mother liquor contains principally salt and ammonium chloride. To this latter liquor milk of lime is added and the ammonium chloride is converted into calcium chloride with liberation of the ammonia in the gaseous state for reuse in the process. The liquor containing salt and calcium chloride, if to be utilized, is then settled and evaporated until the salt has crystallized. The remaining calcium chloride liquor is then further treated to produce one of the marketable forms of calcium chloride.

In order to effect a complete recovery of the ammonia, which is essential for the efficiency of the ammonia-soda process, a limestone high in calcium carbonate has been requisite, as any magnesium oxid present in the milk of lime retards considerably the conversion of the last portion of the ammonium chloride in the liquor into ammonia, unless an excess of lime is added to the mother liquor sufficient to prevent the formation of any magnesium chloride. The magnesium chloride that could possibly be formed would also decrease the purity of the calcium chloride formed.

However I have found that a dolomite, which is a mixture of calcium and magnesium carbonates, can be burned in such a manner that the magnesium carbonate will be decomposed to form magnesium oxid with liberation of carbon dioxid in a gaseous state, while the calcium carbonate will not be affected. The calcined material will consist of magnesium oxid, calcium carbonate and the impurities originally present in the rock. The temperature for such calcination to be most effective is between 400° C. and 600° C. The time required for proper calcination is less at the higher temperature. The type of kiln used is preferably one in which the partial pressure of the carbon dioxid gas will be approximately atmospheric in order to prevent any decomposition of the calcium carbonate. At 600° C. if the partial pressure of the carbon dioxid gas in the kiln is approximately atmospheric, I have found that less than one percent of the calcium carbonate will be decomposed while more than ninety five percent of the magnesium carbonate can be converted into magnesium oxid. It is possible to use the continuous shaft kiln such as is employed in the United States for the calcination of limestone and dolomite in lime production, in which the gases from the combustion of the fuel are in direct contact with the rock. If such a type of kiln is used, a small percentage of lime is generally formed and may be corrected for later. I prefer to use a kiln in which the gas from the decomposition of the rock, which is almost pure carbon dioxid with a small percentage of water vapour caused by blowing steam into the calcination chamber, is the only gas in contact with the rock being calcined. This type of kiln is generally termed a muffle kiln.

I have found that dolomite, when calcined as described above to form magnesium oxid and calcium carbonate, and added to the mother liquor from the ammonia-soda process which has been boiled to decompose the ammonium carbonate in the liquor, this latter step being taken to increase the efficiency of the process and not of necessity, will under suitable conditions liberate the entire quantity of ammonium chloride in the liquor in the form of ammonia and form a solution containing magnesium chloride, with only traces of calcium chloride present. I state the following as a preferred method of recovering the ammonia and forming a solution of mangesium chloride containing only traces of calcium chloride, but I do not limit myself to the following method of recovery as essential to my invention.

To the dolomite calcined as described above, add mother liquor from the ammonia-soda process, which has been previously boiled to decompose the ammonium carbonate content, in such quantity that there will be a slight excess of dolomite based on the quantitative chemical reaction between magnesium oxid and ammonoium chloride. For every 100 pounds of magnesium oxid in the dolomite, add mother liquor containing about 240 pounds of ammonium chloride in solution. The strength of the mother liquor containing ammonium chloride and sodium chloride in solution should be approximately 12° Baumé at 100° C.; varying with the percent. of sodium chloride in the solution; though the desired result can be accomplished less efficiently at other strengths.

I have found that the liberation of the entire quantity of ammonia in the ammonium chloride by magnesium oxid is a gradual process and that some of the ammonia as formed must be removed, perferably by boiling the solution or blowing steam thru it, to permit the decomposition of additional ammonium chloride in the solution. I have also found that less boiling of or blowing steam thru the solution will be necessary to insure complete decomposition of the ammonium chloride and removal of the ammonia formed, if the solution is kept approximately at the original volume during the removal of the ammonia. This can be accomplished by blowing steam thru the mixture in a still in which is also placed a closed steam coil to make up the heat loss and consequent condensation, caused by radiation.

An apparatus suitable for efficient removal of the ammonia from the mixture is illustrated in the accompanying drawings and its operation I describe as follows, but I do not limit myself to such apparatus for successful removal of the ammonia formed in the mixture. The apparatus consists of a series of separate closed stills, and its principle is similar to that of a column still. Five such stills in series allow of the removal of the ammonia with an economic consumption of steam from a boiler or other source of supply.

2 in Fig. 1 represents such a still. The mother liquor and calcined dolomite in proper amount are charged through the manhole 4. Steam is forced in under suitable pressure thru pipe 1 and enters the mixture thru holes in the perforated pipe 6. In this manner the mixture is kept in a proper state of agitation and the entering steam brought into intimate contact with the mixture. The vapour from the mixture consisting principally of steam and ammonia passes out thru pipe 3 to the ammonia tower. To maintain the liquid at constant volume, live steam is passed into the closed coil 7 thru valve $p$, and the condensate is discharged thru steam trap 8. The valve $p$ is adjusted so that the radiation losses are made up by the steam entering thru $p$.

Fig. 2 shows the method of operation of five such stills in series. All valves are considered closed until mention to the contrary. Still $2a$ is charged, valves $a$ and $f$ are opened and live steam admitted at 1, the vapour from still $2a$ passing thru the valve $f$ into pipe 3 which leads to the ammonia tower. This operation is continued until approximately 65 percent of the ammonia content of still $2a$ has been removed. Still $2b$ is then charged with the same mixture as $2a$; valve $f$ closed and valves $g$ and $k$ opened; and an amount of steam blown thru both stills equal to the amount previously passed thru $2a$ alone. Still $2c$ is then charged, valve $g$ closed and valves $h$ and $l$ opened; and a third equal amount of steam blown thru. Still $2d$ is then charged, valve $h$ closed and valves $i$ and $m$ opened; and a fourth equal amount of steam blown thru. Still $2e$ is then charged, valve I closed and valves $j$ and $n$ opened; and a fifth equal amount of steam blown thru.

The five stills are now in use and the following method of recharging is typical of continuous operation. Valves $a$ and $k$ are closed and valve $b$ opened. The removal of the ammonia from still $2a$ is complete, which still is discharged thru gate valve 5 and recharged thru 4 (Fig. 1). Valves $f$ and $o$ are opened and valves $j$ closed, and the operation continued, passing thru equal amounts of steam between each charging. Each still thru which the most steam has been blown is discharged, recharged and placed again in series with the other stills, the discharge from each freshly charged still passing directly into line 3 to the ammonia towers.

In each still the closed live steam coil should be operated to maintain the liquor at constant volume during the operation.

The ammonia and water vapour passing from the last still in the series can be conducted either direct or after passing thru an ammonia concentrator to the towers of the ammonia-soda process for further use in the process.

The mixture discharged from the stills is filtered or drained to remove the calcium carbonate and other solids, and evaporated to crystallize out any salt present. The remaining liquor is then further concentrated and either the crystalline or fused magnesium chloride made therefrom or the liquor used in processes requiring a solution of magnesium chloride.

As heretofore suggested, this process is not limited to the manufacture of magnesium chloride but may be employed for the production of other salts of magnesium, the partly calcined dolomite being treated with a solution of a salt containing the desired acid radical.

I claim:

1. The process of preparing dolomitic limestones as for use in reclaiming ammonia from the mother liquors produced in the ammonia-soda process which consists in calcining the same at temperatures below those customarily employed in the burning of lime while maintaining thereon during the calcination a partial pressure of carbon dioxide at least not substantially less than atmospheric pressure.

2. The process of making magnesium chloride in aqueous solution substantially free from impurities of calcium compounds which contains the steps of treating the boiled mother liquor produced by the ammonia-soda process with the pulverized product produced by calcining dolomite under temperatures and conditions serving to decarbonate the magnesium carbonate content without substantially affecting the calcium carbonate content thereof.

3. The process of producing from dolomite a magnesium chloride substantially free from calcium compounds, which contains the steps of first calcining the dolomite at temperatures below about 600° Centigrade, whereby the magnesium carbonate is chiefly decomposed into magnesia, leaving the calcium carbonate substantially unchanged, and thereafter agitating the calcined products with a solution of ammonium chloride at approximately boiling temperature.

4. The process for producing from dolomite a water-soluble magnesium salt substantially free from calcium compounds which contains the steps of, first, calcining the dolomite at temperatures below those customarily employed for the burning of lime and maintaining thereon during the calcining a partial pressure of carbon dioxide in excess of that customarily allowed in the burning of lime, whereby the magnesium carbonate thereof is reduced to oxide form substantially without decomposition of the calcium carbonate, and then agitating the calcined products at approximately boiling temperatures with a solution of an ammonium salt containing an acid radical capable of forming a water-soluble magnesium salt which reacts upon the magnesia without affecting the calcium carbonate.

5. The process of making magnesium chloride from dolomite which comprises calcining such dolomite to decompose the magnesium carbonate and not to attack the calcium carbonate therein, reacting such calcined product with an aqueous solution containing ammonium chloride and separating the resulting ammonia and the undecomposed carbonate from the solution of magnesium chloride formed by such reaction.

6. The process of making magnesium chloride from dolomite which comprises calcining such dolomite at a temperature not greatly in excess of 600° C. while maintaining a partial pressure of carbon dioxide thereon not greatly less than one atmosphere, reacting such calcined product with an aqueous solution containing ammonium chloride at approximately boiling temperature, distilling off the resulting ammonia and separating the undecomposed unreacted calcium carbonate from the solution of magnesium chloride formed by such reaction.

7. The process of making a water-soluble magnesium salt from dolomite which comprises calcining such dolomite under such condition of temperature and pressure as to decompose the magnesium carbonate and not to attack the calcium carbonate therein, reacting such calcined product with an aqueous solution of an ammonium salt containing an acid radical capable of forming a water-soluble magnesium salt and separating the resulting ammonia and the undecomposed calcium carbonate from the solution of magnesium salt formed by such reaction.

8. The process of making a water-soluble magnesium salt from dolomite which comprises calcining such dolomite at a temperature not greatly in excess of 600° C. while maintaining a partial pressure of carbon dioxide thereon not greatly less than one atmosphere, reacting such calcined product with an aqueous solution of an ammonium salt containing an acid radical capable of forming a water-soluble magnesium salt at approximately boiling temperature, distilling off the resulting ammonia and separating the unreacted calcium carbonate from the solution of magnesium salt formed by such reaction.

9. The process of separating calcium and magnesium compounds from dolomite which comprises calcining such dolomite at a temperature not greatly in excess of 600° C. and at a partial pressure of carbon dioxide equal approximately to atmospheric pressure, and reacting such calcined product with an aqueous solution of an ammonium salt containing an acid radical capable of forming a water-soluble magnesium salt, whereby a solution of the corresponding magnesium salt is formed and an insoluble residue of calcium carbonate remains.

RICHARD C. LORD.